US012583951B2

(12) United States Patent
Isomura et al.

(10) Patent No.: US 12,583,951 B2
(45) Date of Patent: Mar. 24, 2026

(54) MONOMER MIXTURE, RESIN COMPOSITION, RESIN MOLDED ARTICLE, PANEL FOR AQUARIUMS, ILLUMINATED SIGN, BUILDING COMPONENT, METHOD FOR PRODUCING RESIN COMPOSITION, AND METHOD FOR MANUFACTURING RESIN CAST BOARD

(71) Applicant: Mitsubishi Chemical Corporation, Tokyo (JP)

(72) Inventors: Manabu Isomura, Tokyo (JP); Shouta Ichise, Tokyo (JP)

(73) Assignee: Mitsubishi Chemical Corporation, Tokyo (JP)

( * ) Notice: Subject to any disclaimer, the term of this patent is extended or adjusted under 35 U.S.C. 154(b) by 141 days.

(21) Appl. No.: 18/231,696

(22) Filed: Aug. 8, 2023

(65) Prior Publication Data

US 2024/0043582 A1 Feb. 8, 2024

Related U.S. Application Data

(63) Continuation of application No. PCT/JP2022/012961, filed on Mar. 22, 2022.

(30) Foreign Application Priority Data

Mar. 23, 2021 (JP) ................................ 2021-048881

(51) Int. Cl.
*C08F 20/14* (2006.01)
*C08K 5/521* (2006.01)
*C08K 5/5377* (2006.01)

(52) U.S. Cl.
CPC .............. *C08F 20/14* (2013.01); *C08K 5/521* (2013.01); *C08K 5/5377* (2013.01)

(58) Field of Classification Search
CPC ........................................... C08K 5/49–5/5399
See application file for complete search history.

(56) References Cited

U.S. PATENT DOCUMENTS

2011/0112226 A1 5/2011 Rudiger et al.
2018/0223091 A1* 8/2018 Ishihara ................ C08F 265/06

FOREIGN PATENT DOCUMENTS

| | | | |
|---|---|---|---|
| CN | 107109020 | A | 8/2017 |
| JP | 2003-138086 | A | 5/2003 |
| JP | 2011-046835 | A | 3/2011 |
| JP | 2014-167087 | A | 9/2014 |
| JP | 2017-193641 | A | 10/2017 |
| JP | 2018-154763 | A | 10/2018 |
| JP | 2019-189749 | A | 10/2019 |
| TW | 200911916 | A | 3/2009 |
| WO | 2017/154722 | A1 | 9/2017 |

OTHER PUBLICATIONS

Machine translation of JP 2003138086. Retrieved Jul. 23, 2025.*
International Search Report issued in related International Patent Application No. PCT/JP2022/012961 dated Jun. 7, 2022.
Office Action issued in corresponding Taiwanese Patent Application No. 111110644, dated May 8, 2025.
Office Action issued in corresponding Chinese Patent Application No. 202280018047.3, dated Jul. 30, 2025.
Office Action issued in corresponding Japanese Patent Application No. 2023-509166, dated Nov. 4, 2025.
Office Action issued in corresponding Chinese Patent Application No. 202280018047.3, dated Feb. 4, 2026.

* cited by examiner

*Primary Examiner* — Prashant J Khatri
(74) *Attorney, Agent, or Firm* — Morgan, Lewis & Bockius LLP

(57) ABSTRACT

Provided is a resin composition for obtaining a resin molded product which simultaneously exhibits three excellent effects of flame retardance, heat resistance, and mechanical strength. One aspect of the resin composition of the present invention is obtained by radically polymerizing a monomer mixture containing methyl methacrylate, a phosphorus atom-containing compound (C), and a phosphine compound (D), where the phosphorus atom-containing compound (C) comprises at least one selected from a phosphoric acid ester compound and a phosphonic acid ester compound, and the phosphine compound (D) is represented by Formula (I).

(I)

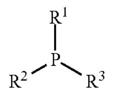

[In Formula (I), $R^1$, $R^2$, and $R^3$ each independently represent an aromatic hydrocarbon group having 6 to 12 carbon atoms, or the like].

12 Claims, No Drawings

MONOMER MIXTURE, RESIN COMPOSITION, RESIN MOLDED ARTICLE, PANEL FOR AQUARIUMS, ILLUMINATED SIGN, BUILDING COMPONENT, METHOD FOR PRODUCING RESIN COMPOSITION, AND METHOD FOR MANUFACTURING RESIN CAST BOARD

This application is a continuation application of International Application No. PCT/JP2022/012961, filed on Mar. 22, 2022, which claims the benefit of priority of the prior Japanese Patent Application No. 2021-048881, filed Mar. 23, 2021, the content of which is incorporated herein by reference.

TECHNICAL FIELD

The present invention relates to a monomer mixture, a resin composition, a resin molded product, a panel for aquariums, an illuminated sign, a building component, a method for producing a resin composition, and a method for manufacturing a resin cast board.

BACKGROUND ART

A resin such as a (meth)acrylic resin or a polycarbonate-based resin has excellent transparency, heat resistance, and weather fastness, and has a balanced performance in resin physical properties such as mechanical strength, thermal properties, and molding processability. Therefore, it is used in a large number of use applications such as face plates of illumination materials, optical materials, signboards, displays, decorative members, building components, and electronic apparatuses.

In particular, due to the reason that favorable transparency can be maintained even in a case where a product thickness is large, a (meth)acrylic resin is used in use applications that require a product thickness, such as water tank panels in an aquarium and building components.

In recent years, in the above-described use applications, resin products are required to have flame retardance in order to prevent the spread of fire in a case of an outbreak of a fire and to provide an evacuation time.

In the above-described use applications, high stability against heat is required due to outdoor use in a state of being exposed to a high temperature environment for a long time, and resin products are required to have heat resistance.

In the above-described use applications, high stability against external force is required, and resin products are required to have heat resistance and mechanical strength.

As a technique for imparting flame retardance and heat resistance to a (meth)acrylic resin, for example, Patent Document 1 proposes a methacrylic resin plate consisting of a methacrylic resin containing a monomer having improved heat resistance, and a halogenated phosphoric acid ester, and discloses dicyclopentanyl (meth)acrylate as the monomer having improved heat resistance.

Patent Document 2 discloses a (meth)acrylic polymer containing methyl methacrylate and an isobornyl (meth) acrylate unit, and a methacrylic resin plate containing a phosphorus-based compound as a flame retardant.

Patent Document 3 discloses an organic disulfide compound and a methacrylic resin composition containing at least one selected from a phosphine-based compound and a phosphine oxide-based compound.

CITATION LIST

Patent Documents

Patent Document 1

Japanese Unexamined Patent Application, First Publication No. 2011-046835

Patent Document 2

Japanese Unexamined Patent Application, First Publication No. 2017-193641

Patent Document 3

Japanese Unexamined Patent Application, First Publication No. 2014-167087

SUMMARY OF INVENTION

Technical Problem

The heat resistance of all of the methacrylic resin plate described in Patent Document 1, the methacrylic resin plate described in Patent Document 2, and the methacrylic resin composition described in Patent Document 3 was insufficient. In addition, the flame retardance was insufficient for use in parts of electronic apparatuses, which require V-0 in a vertical combustion test defined by UL94.

Under such circumstances, there is a demand for a resin molded product having excellent heat resistance, flame retardance, and furthermore mechanical strength, and a resin composition for producing such a resin molded product.

An object of the present invention is to provide a resin composition for obtaining a resin molded product which simultaneously exhibits three excellent effects of flame retardance, heat resistance, and mechanical strength.

Solution to Problem

The present invention has the following aspects.

[1] A monomer mixture comprising:

methyl methacrylate;

a phosphorus atom-containing compound (C); and a phosphine compound (D), wherein the phosphorus atom-containing compound (C) comprises at least one selected from a phosphoric acid ester compound and a phosphonic acid ester compound, and the phosphine compound (D) is represented by Formula (I).

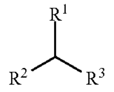

(I)

[In Formula (I), $R^1$, $R^2$, and $R^3$ each independently represent a hydrogen atom, an alkyl group having 1 to 12 carbon atoms, a cycloalkyl group having 5 to 12 carbon atoms, a (cycloalkyl)alkyl group having 6 to 12 carbon atoms, an aryl group having 6 to 12 carbon atoms, or an aralkyl group having 7 to 12 carbon atoms.]

[2] The monomer mixture according to [1], wherein the phosphoric acid ester compound comprises a compound represented by Formula (II).

(II)

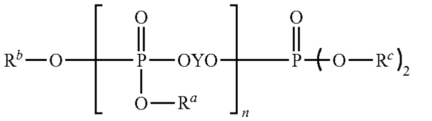

[In Formula (II), $R^a$, $R^b$, and $R^c$ each independently represent a hydrogen atom, an alkyl group having 1 to 8 carbon atoms, or a chloroalkyl group having 1 to 8 carbon atoms, Y represents an alkylene group having 1 to 10 carbon atoms, which may contain a heteroatom, and n represents an integer of 0 to 8.]

[3] The monomer mixture according to [1] or [2], wherein the phosphonic acid ester compound comprises a compound represented by Formula (III).

(III)

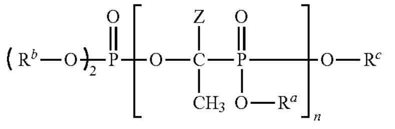

[In Formula (III), $R^a$, $R^b$, $R^c$, and Z each independently represent a hydrogen atom, an alkyl group having 1 to 8 carbon atoms, or a chloroalkyl group having 1 to 8 carbon atoms, and n represents an integer of 0 to 8.]

[4] The monomer mixture according to any one of [1] to [3], wherein the phosphine compound (D) comprises triphenylphosphine.

[5] A resin composition that is obtained by a radical polymerization of the monomer mixture according to any one of [1] to [4].

[6] The resin composition according to [5], comprising:

a (meth)acrylic polymer (P), wherein the (meth)acrylic polymer (P) comprises a repeating unit derived from an ethylenically unsaturated monomer, and a content proportion of the ethylenically unsaturated monomer which is unreacted, in the resin composition, is 4% by mass or less.

[7] A resin composition comprising:

a (meth)acrylic polymer (P); and a phosphine compound (D), wherein the (meth)acrylic polymer (P) comprises a repeating unit derived from an ethylenically unsaturated monomer, a content proportion of the ethylenically unsaturated monomer which is unreacted, in the resin composition, is 4% by mass or less, and the phosphine compound (D) is represented by Formula (I).

(I)

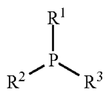

[In Formula (I), $R^1$, $R^2$, and $R^3$ each independently represent a hydrogen atom, an alkyl group having 1 to 12 carbon atoms, a cycloalkyl group having 5 to 12 carbon atoms, a (cycloalkyl)alkyl group having 6 to 12 carbon atoms, an aryl group having 6 to 12 carbon atoms, or an aralkyl group having 7 to 12 carbon atoms.]

[8] The resin composition according to [6] or [7], wherein the repeating unit derived from the ethylenically unsaturated monomer comprises a repeating unit derived from a (meth)acrylic acid ester (M) having, in a side chain, an aromatic hydrocarbon group or an alicyclic hydrocarbon group having 3 to 20 carbon atoms.

[9] A resin composition comprising:

a (meth)acrylic polymer (P); and a phosphine compound (D), wherein the (meth)acrylic polymer (P) comprises a repeating unit derived from an ethylenically unsaturated monomer, the repeating unit derived from the ethylenically unsaturated monomer comprises a repeating unit derived from a (meth)acrylic acid ester (M) having, in a side chain, an aromatic hydrocarbon group or an alicyclic hydrocarbon group having 3 to 20 carbon atoms, and the phosphine compound (D) is represented by Formula (I).

(I)

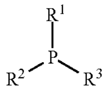

[In Formula (I), $R^1$, $R^2$, and $R^3$ each independently represent a hydrogen atom, an alkyl group having 1 to 12 carbon atoms, a cycloalkyl group having 5 to 12 carbon atoms, a (cycloalkyl)alkyl group having 6 to 12 carbon atoms, an aryl group having 6 to 12 carbon atoms, or an aralkyl group having 7 to 12 carbon atoms.]

[10] The resin composition according to [9], wherein a content proportion of the ethylenically unsaturated monomer which is unreacted is 4% by mass or less.

[11] The resin composition according to any one of [6] to [10], wherein the (meth)acrylic polymer (P) comprises a repeating unit derived from methyl methacrylate, and a content proportion of the repeating unit derived from the methyl methacrylate is 60% to 100% by mass with respect to 100% by mass of a total mass of the (meth)acrylic polymer (P).

[12] The resin composition according to any one of [8] to [10], wherein a content proportion of the repeating unit derived from the (meth)acrylic acid ester (M) having, in a side chain, an aromatic hydrocarbon group or an alicyclic hydrocarbon group having 3 to 20 carbon atoms is 2% to 40% by mass with respect to 100% by mass of a total mass of the (meth)acrylic polymer (P).

[13] The resin composition according to any one of [6] to [12], wherein the (meth)acrylic polymer (P) comprises a structural unit derived from a monomer (B) having two or more vinyl groups, and a content proportion of the structural unit derived from the monomer (B) having two or more vinyl groups is 0.02% to 0.4% by mass with respect to 100% by mass of a total mass of the (meth)acrylic polymer (P).

[14] The resin composition according to [6], wherein a content of the phosphorus atom-containing compound (C) is 5 to 35 parts by mass with respect to 100 parts by mass of the (meth)acrylic polymer (P).

[15] The resin composition according to any one of [5] to [14], wherein a content of the phosphine compound (D) in the resin composition is 20 to 2,000 ppm by mass with respect to 100% by mass of a total mass of the resin composition.

[16] A resin molded product comprising:

the resin composition according to any one of [5] to [15].

[17] The resin molded product according to [16], wherein the resin molded product has a flame retardance of V-0 in a vertical combustion test defined by UL94, and a thickness of the resin molded product is 6 mm or more.

[18] A panel for aquariums, comprising:

the resin molded product according to [16] or [17].

[19] An illuminated sign comprising:

the resin molded product according to [16] or [17].

[20] A building component comprising:

the resin molded product according to [16] or [17].

[21] A method for producing a resin composition, comprising:

preparation of a polymerizable composition (S2) in which a phosphorus atom-containing compound (C) and a phosphine compound (D) are added to a monomer composition (S1) comprising methyl methacrylate; and polymerization of the polymerizable composition (S2), wherein the phosphorus atom-containing compound (C) comprises at least one selected from a phosphoric acid ester compound and a phosphonic acid ester compound, and the phosphine compound (D) is represented by Formula (I).

(I)

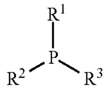

[In Formula (I), $R^1$, $R^2$, and $R^3$ each independently represent a hydrogen atom, an alkyl group having 1 to 12 carbon atoms, a cycloalkyl group having 5 to 12 carbon atoms, a (cycloalkyl)alkyl group having 6 to 12 carbon atoms, an aryl group having 6 to 12 carbon atoms, or an aralkyl group having 7 to 12 carbon atoms.]

[22] A method for manufacturing a resin cast board, comprising:

injecting a syrup containing a monomer mixture into a cell and polymerizing the monomer mixture, wherein the monomer mixture comprises methyl methacrylate, a phosphorus atom-containing compound (C), and a phosphine compound (D), the phosphorus atom-containing compound (C) comprises at least one selected from a phosphoric acid ester compound and a phosphonic acid ester compound, and the phosphine compound (D) is represented by Formula (I).

(I)

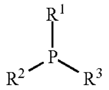

[In Formula (I), $R^1$, $R^2$, and $R^3$ each independently represent a hydrogen atom, an alkyl group having 1 to 12 carbon atoms, a cycloalkyl group having 5 to 12 carbon atoms, a (cycloalkyl)alkyl group having 6 to 12 carbon atoms, an aryl group having 6 to 12 carbon atoms, or an aralkyl group having 7 to 12 carbon atoms.]

[23] A method for manufacturing a resin cast board, comprising:

injecting a syrup comprising the monomer mixture according to [1] into a cell and polymerizing the monomer mixture.

Advantageous Effects of Invention

According to the present invention, it is possible to provide a resin composition for obtaining a resin molded product which simultaneously exhibits three excellent effects of flame retardance, heat resistance, and mechanical strength.

DESCRIPTION OF EMBODIMENTS

In the present invention, "(meth)acrylate" means at least one selected from "acrylate" and "methacrylate", and "(meth)acrylic acid" means at least one selected from "acrylic acid" and "methacrylic acid".

"Monomer" means an unpolymerized compound, and "repeating unit" means a unit formed by the polymerization of a monomer and derived from the monomer. The repeating unit may be a unit directly formed by a polymerization reaction or may be a unit in which a part is converted into another structure through a treatment of a polymer. The term "structural unit" means a unit derived from a monomer that is used in the production of a resin composition.

In the present invention, "% by mass" indicates a content proportion of a predetermined component contained in 100% by mass of the total amount.

In the present specification, a numerical value range indicated by using "to" means a range including numerical values described before and after "to" as the lower limit value and the upper limit value, and thus "A to B" means A or more and B or less.

<Resin Composition>

A resin composition according to a first embodiment of the present invention (hereinafter, also referred to as a resin composition (1)) is obtained by a radical polymerization of a monomer mixture described below.

A resin composition according to a second embodiment of the present invention (hereinafter, also referred to as a resin composition (2)) is obtained by a radical polymerization of a monomer mixture described below, where the resin composition contains a (meth)acrylic polymer (P) (hereinafter, also simply referred to as a "(meth)acrylic polymer (P)") containing a repeating unit derived from an ethylenically unsaturated monomer (hereinafter, also referred to as an "ethylenically unsaturated monomer unit") and a content proportion of the ethylenically unsaturated monomer which is unreacted is 4% by mass or less.

A resin composition according to a third embodiment of the present invention (hereinafter, also referred to as a resin composition (3)) contains a (meth)acrylic polymer (P) and a specific phosphine compound (D), where a content proportion of the ethylenically unsaturated monomer which is unreacted is 4% by mass or less.

A resin composition according to a fourth embodiment of the present invention (hereinafter, also referred to as a resin composition (4)) contains a (meth)acrylic polymer (P) and a specific phosphine compound (D), where the repeating unit derived from the ethylenically unsaturated monomer includes a repeating unit (hereinafter, also referred to as a "(meth)acrylic acid ester (M) unit") derived from a (meth) acrylic acid ester (M) having, in a side chain, an aromatic hydrocarbon group or an alicyclic hydrocarbon group having 3 to 20 carbon atoms.

When the resin compositions (1) to (4) (hereinafter, also collectively referred to as a "resin composition") of the present invention contain the (meth)acrylic polymer (P), the content proportion of the unreacted ethylenically unsaturated monomer derived from the raw material of the (meth) acrylic polymer (P) is preferably 4% by mass or less, more preferably 3% by mass or less, and still more preferably 2% by mass or less, with respect to 100% by mass of the total mass of the resin composition. In a case where it is set to be equal to or smaller than the above-described upper limit value, the heat resistance and mechanical strength of the obtained resin molded product can be made excellent.

The lower limit of the content proportion of the unreacted ethylenically unsaturated monomer is not particularly limited and may be 0% by mass.

When the resin composition of the present invention contains a phosphorus atom-containing compound (C), the lower limit of the content of the phosphorus atom-containing compound (C) contained in the resin composition of the present invention is not particularly limited. It is preferably 5 parts by mass or more, more preferably 6 parts by mass or more, and still more preferably 7 parts by mass or more, with respect to 100 parts by mass of the (meth)acrylic polymer (P) due to the reason that the flame retardance of a resin molded product containing the resin composition of the present invention or a resin molded product obtained by molding the resin composition of the present invention (hereinafter, also referred to as an "obtained resin molded product" or a "resin molded product") is favorable. The upper limit of the content of the phosphorus atom-containing compound (C) is not particularly limited. Due to the reason that the heat resistance of the obtained resin molded product is favorable, it is preferably 35 parts by mass or less, more preferably 23 parts by mass or less, and still more preferably 18 parts by mass or less, with respect to 100 parts by mass of the (meth)acrylic polymer.

The upper limit value and lower limit value described above can be freely combined. For example, the content of the phosphorus atom-containing compound (C) contained in the resin composition of the present invention is preferably 5 to 35 parts by mass, more preferably 6 to 23 parts by mass, and still more preferably 7 to 18 parts by mass, with respect to 100 parts by mass of the resin composition.

The lower limit of the content of the phosphine compound (D) contained in the resin composition of the present invention is not particularly limited. Due to the reason that the heat resistance and mechanical strength of the obtained resin molded product are favorable, it is preferably 20 ppm by mass or more, more preferably 100 ppm by mass or more, and still more preferably 200 ppm by mass or more, with respect to 100% by mass of the resin composition. The upper limit of the content of the phosphine compound (D) is not particularly limited. Due to the reason that the heat resistance and mechanical strength of the obtained resin molded product can be favorably maintained, it is preferably 2,000 ppm by mass or less, more preferably 1,000 ppm by mass or less, and still more preferably 600 ppm by mass or less, with respect to 100% by mass of the resin composition.

The upper limit value and lower limit value described above can be freely combined. For example, the content of the phosphine compound (D) contained in the resin composition of the present invention is preferably 20 to 2,000 ppm by mass, more preferably 100 ppm by mass or more to 1,000 ppm by mass, and still more preferably 200 to 600 ppm by mass, with respect to 100% by mass of the resin composition.

When the resin composition of the present invention contains the (meth)acrylic polymer (P), the lower limit of the content of the (meth)acrylic polymer (P) contained in the resin composition of the present invention is not particularly limited. Due to the reason that the heat resistance and mechanical strength of the obtained resin molded product are favorable, it is preferably 65% by mass or more, more preferably 77% by mass or more, and still more preferably 82% by mass or more, with respect to 100% by mass of the resin composition. The upper limit of the content of the (meth)acrylic polymer (P) is not particularly limited. From the viewpoint the flame retardance of the obtained resin molded product can be favorably maintained, it is preferably 95% by mass or less, more preferably 94% by mass or less, and still more preferably 93% by mass or less, with respect to 100% by mass of the resin composition.

The upper limit value and lower limit value described above can be freely combined. For example, the content of the (meth)acrylic polymer (P) contained in the resin composition of the present invention is preferably 65% to 95% by mass, more preferably 77% to 94% by mass, and still more preferably 82% to 93% by mass, with respect to 100% by mass of the resin composition.

<(Meth)Acrylic Polymer (P)>

The resin compositions (2) to (4) according to the present invention contain the (meth)acrylic polymer (P).

In a case of containing the (meth)acrylic polymer (P), it is possible to obtain a resin molded product excellent in flame retardance, heat resistance, and mechanical strength due to a synergistic effect with other constitutional components.

In the present invention, the ethylenically unsaturated monomer is a monomer having one ethylenically unsaturated bond in the molecule. Specifically, examples thereof include the following (a) to (k).

(a) (Meth)acrylic acid alkyl ester monomers having an alkyl group having 1 to 20 carbon atoms in the side chain, such as methyl (meth)acrylate, ethyl (meth) acrylate, n-propyl (meth)acrylate, isopropyl (meth) acrylate, n-butyl (meth)acrylate, i-butyl (meth)acrylate, tert-butyl (meth)acrylate, n-hexyl (meth)acrylate, n-octyl (meth)acrylate, 2-ethylhexyl (meth)acrylate, tridecyl (meth)acrylate, stearyl (meth)acrylate, cyclohexyl (meth)acrylate, benzyl (meth)acrylate, and isobornyl (meth)acrylate (b) Acrylic acid and methacrylic acid (c) Styrenes such as styrene and α-methylstyrene (d) Acrylonitriles such as acrylonitrile and methacrylonitrile (e) Ethylenically unsaturated carboxylic acids such as maleic acid, maleic acid anhydride, fumaric acid, crotonic acid, and itaconic acid (f) Ethylenically unsaturated sulfonic acids such as ethylene sulfonic acid (g) 2-acrylamide-2-methylpropane acid (h) Ethylenically unsaturated phosphonic acids (i) A hydroxyl group-containing vinyl monomer such as a hydroxyalkyl ester of acrylic acid or methacrylic acid (j) Acrylamides (k) Glycidyl esters of acrylic acid or methacrylic acid One embodiment of the (meth)acrylic polymer (P) includes a polymer which contains 60% to 100% by mass of a repeating unit derived from methyl methacrylate (MMA) (hereinafter, referred to as an "MMA unit") with respect to 100% of the total mass of the ethylenically unsaturated monomer unit and contains 0% to 40% by mass of a monomer unit other than the MMA unit. In a case where the content proportion of the monomer unit other than the MMA unit is within the above-described range, it is easy to obtain sufficient transparency of the resin molded product.

Examples of the monomer unit other than the MMA unit include the above-described ethylenically unsaturated monomer unit other than the MMA unit, examples of which include a repeating unit derived from an alkyl (meth)acrylate having an alkyl group having 3 to 20 carbon atoms or styrenes.

Another embodiment of the (meth)acrylic polymer (P) includes a polymer containing 60% to 100% by mass of the MMA unit and containing 0% to 40% by mass of the (meth)acrylic acid ester (M) unit with respect to 100% of the total mass of the ethylenically unsaturated monomer unit.

The lower limit of the content proportion of the MMA unit contained in the (meth)acrylic polymer (P) is not particularly limited. Due to the reason that the impact resistance and mechanical strength of the obtained resin molded product are favorable, it is preferably 60% by mass or more, more preferably 80% by mass or more, and still more preferably 90% by mass or more, with respect to 100% by mass of the total mass of the (meth)acrylic polymer (P). The upper limit of the content proportion of the MMA unit is not particularly limited. It may be set to 100% by mass or may be set to less than 100% by mass, and it is preferably 98% by mass or less, more preferably 97% by mass or less, and still more preferably 96% by mass or less, with respect to 100% by mass of the total mass of the (meth)acrylic polymer (P) due to the reason that the flame retardance of the resin molded product is favorable.

The upper limit value and lower limit value described above can be freely combined. For example, the content proportion of the MMA unit in the (meth)acrylic polymer (P) is preferably 60% to 98% by mass, more preferably 80% to 97% by mass, and still more preferably 90% to 96% by mass, with respect to 100% by mass of the total mass of the (meth)acrylic polymer (P).

When the (meth)acrylic polymer (P) contains the (meth)acrylic acid ester (M) unit, the lower limit of the content proportion of the (meth)acrylic acid ester (M) unit contained in the (meth)acrylic polymer (P) is not particularly limited. It is preferably 2% by mass or more, more preferably 3% by mass or more, and still more preferably 4% by mass or more, with respect to 100% by mass of the total mass of the (meth)acrylic polymer (P) due to the reason that the flame retardance of the obtained resin molded product is favorable. The upper limit of the content proportion of the (meth)acrylic acid ester (M) unit is not particularly limited. Due to the reason that the impact resistance and mechanical strength of the resin molded product are favorable, it is preferably 40% by mass or less, more preferably 20% by mass or less, and still more preferably 10% by mass or less, with respect to 100% by mass of the total mass of the (meth)acrylic polymer (P).

The upper limit value and lower limit value described above can be freely combined. For example, the content proportion of the (meth)acrylic acid ester (M) unit contained in the (meth)acrylic polymer (P) is preferably 2% to 40.0% by mass, more preferably 3% to 20% by mass, and still more preferably 4% to 10% by mass, with respect to 100% by mass of the total mass of the (meth)acrylic polymer (P).

The (meth)acrylic polymer (P) can contain a repeating unit (hereinafter, referred to as a "monomer (B) unit") derived from a monomer (B) having two or more vinyl groups (hereinafter, simply also referred to as a "monomer (B)") with respect to the total mass of the (meth)acrylic polymer (P).

When the (meth)acrylic polymer (P) contains the monomer (B) unit, the lower limit of the content proportion of the monomer (B) unit contained in the (meth)acrylic polymer (P) is not particularly limited. Due to the reason that the flame retardance of the obtained resin molded product is favorable, it is preferably 0.02% by mass or more, more preferably 0.05% by mass or more, and still more preferably 0.1% by mass or more, with respect to 100% by mass of the total mass of the (meth)acrylic polymer (P). The upper limit of the content proportion of the monomer (B) unit is not particularly limited. Due to the reason that the impact resistance and mechanical strength of the resin molded product are favorable, it is preferably 0.4% by mass or less, more preferably 0.35% by mass or less, and still more preferably 0.3% by mass or less, with respect to 100% by mass of the total mass of the (meth)acrylic polymer (P).

The upper limit value and lower limit value described above can be freely combined. For example, the content proportion of the monomer (B) unit in the (meth)acrylic polymer (P) is preferably 0.02% to 0.4% by mass, more preferably 0.05% to 0.35% by mass, and still more preferably 0.1% to 0.3% by mass, with respect to 100% by mass of the total mass of the (meth)acrylic polymer (P).

Examples of the (meth)acrylic polymer (P) include a polymer containing the MMA unit, the (meth)acrylic acid ester (M) unit, and the monomer (B) unit in the following content proportion with respect to 100% by mass of the total mass of the (meth)acrylic polymer (P).

(a) A copolymer containing 60% by mass or more and less than 100% by mass of the MMA unit or a homopolymer of the MMA.

(b) A copolymer containing 99.6% to 99.98% by mass of the MMA unit and 0.02% to 0.4% by mass of the monomer (B) unit.

(c) A copolymer containing 60% to 98% by mass of the MMA unit and 2% to 40% by mass of the (meth)acrylic acid ester (M) unit.

(d) A copolymer containing 60% to 98% by mass of the MMA unit, 2% to 40% by mass of the (meth)acrylic acid ester (M) unit, and 0.02% to 0.4% by mass of the monomer (B) unit.

However, the total of each of the monomer units is 100% by mass.

<(Meth)Acrylic Acid Ester (M)>

In the present invention, the (meth)acrylic polymer (P) may contain a (meth)acrylic acid ester (M) unit.

The (meth)acrylic acid ester (M) unit contains at least one selected from a repeating unit derived from a methacrylic acid ester (M1) having, in a side chain, an aromatic hydrocarbon or an alicyclic hydrocarbon having 3 to 20 carbon atoms (hereinafter, also referred to as a "methacrylic acid ester (M1) unit"), or a repeating unit derived from an acrylic acid ester (M2) having, in a side chain, an aromatic hydrocarbon group or an alicyclic hydrocarbon group having 3 to 20 carbon atoms (hereinafter, also referred to as an "acrylic acid ester (M2)") (hereinafter, as necessary, the methacrylic acid ester (M1) and the acrylic acid ester (M2) are also collectively referred to as a "(meth)acrylic acid ester (M)").

In a case where the (meth)acrylic polymer (P) contains the (meth)acrylic acid ester (M) unit, it is possible to improve the flame retardance of the obtained resin molded product.

When the (meth)acrylic polymer (P) contains the (meth) acrylic acid ester (M) unit, a side chain of the (meth)acrylic acid ester (M) unit is eliminated in a case where heat is applied to the (meth)acrylic acid ester (M) unit and converted into the (meth)acrylic acid unit. The (meth)acrylic acid unit interacts with the phosphorus atom-containing compound (C) to increase the amount of carbide (char) generated in a case where the obtained resin composition is combusted. The carbide (char) functions as a barrier layer that hinders the transfer of radiant heat to the resin composition and enhances the flame retardance of the obtained resin molded product. As a result, the flame retardance of the obtained resin molded product is improved. The side chain eliminated from the (meth)acrylic acid ester (M) unit can consume oxygen to cause a combustion field to be in an oxygen-deficient state, which further improves the flame retardance of the obtained resin molded product.

In addition, the presence of the monomer (B) unit further accelerates the generation of carbide (char).

Further, the acrylic acid ester (M2) has an effect of synergistically increasing the effect of improving the flame retardance of the phosphorus atom-containing compound (C) described later by interacting with the phosphorus atom-containing compound (C), and thus the flame retardance of the resin molded product can be improved.

Examples of the (meth)acrylic acid ester (M) include (meth)acrylic acid esters such as cyclohexyl (meth)acrylate, bornyl (meth)acrylate, norbornyl (meth)acrylate, isobornyl (meth)acrylate, adamantyl (meth)acrylate, dimethyladamantyl (meth)acrylate), methylcyclohexyl methacrylate, norbornylmethyl (meth)acrylate, menthyl (meth)acrylate, fenchyl (meth)acrylate, dicyclopentanyl (meth)acrylate, dicyclopentenyl (meth)acrylate, dicyclopentenyloxyethyl (meth)acrylate, cyclodecyl (meth)acrylate, 4-tert-butylcyclohexyl (meth)acrylate, trimethylcyclohexyl (meth)acrylate, phenyl (meth)acrylate, benzyl (meth)acrylate, and phenoxyethyl (meth)acrylate, and derivatives thereof, which are not limited thereto.

From the viewpoint that the effect of improving the flame retardance of the obtained resin molded product is excellent, the (meth)acrylic acid ester (M) is preferably isobornyl (meth)acrylate or cyclohexyl (meth)acrylate. From the viewpoint that the flame retardance of the obtained resin molded product is more excellent, isobornyl (meth)acrylate is more preferable.

The (meth)acrylic acid ester (M) can be used alone, or a combination of two or more kinds thereof can be used.

From the viewpoint that the flame retardance of the obtained resin molded product is more excellent, the (meth) acrylic acid ester (M) is preferably the methacrylic acid ester (M1). From the viewpoint that the flame retardance and heat resistance of the obtained resin molded product is more excellent, it is preferably isobornyl methacrylate or cyclohexyl methacrylate and more preferably isobornyl methacrylate.

From the viewpoint that the weather fastness of the obtained resin molded product is more excellent, the (meth) acrylic acid ester (M) is preferably the acrylic acid ester (M2). From the viewpoint that the flame retardance and weather fastness of the obtained resin molded product is more excellent, it is preferably cyclohexyl acrylate or isobornyl acrylate and more preferably isobornyl acrylate.

<Monomer (B)>

In the present invention, the (meth)acrylic polymer (P) may contain the monomer (B) unit.

In a case where the (meth)acrylic polymer (P) contains the monomer (B) unit, it is possible to improve the flame retardance of the obtained resin molded product.

The monomer (B) is preferably a difunctional (meth) acrylate. Examples thereof include alkanediol di(meth)acrylates such as ethylene glycol di(meth)acrylate, 1,2-propylene glycol di(meth)acrylate, 1,3-propylene glycol di(meth) acrylate, 1,2-butylene glycol di(meth)acrylate, 1,3-butylene glycol di(meth)acrylate, 1,4-butylene glycol di(meth)acrylate, 2,3-butylene glycol di(meth)acrylate, 1,6-hexanediol di(meth)acrylate, neopentyl glycol di(meth)acrylate, and tricyclodecanedimethanol di(meth)acrylate, which are not limited thereto.

A monomer having 10 to 18 carbon atoms as the monomer (B) has favorable handleability of raw materials, and thus the workability when producing the resin composition can be improved.

As the monomer (B), ethylene glycol di(meth)acrylate or neopentyl glycol di(meth)acrylate can make the flame retardance of the resin molded product more excellent in addition to having excellent handleability of raw materials, which is preferable.

The monomer (B) can be used alone, or a combination of two or more kinds thereof can be used.

<Copolymerizable Monomer>

The (meth)acrylic polymer (P) may contain 0% to 12% by mass, preferably 0% to 9% by mass of a repeating unit derived from a monomer (hereinafter, also referred to as "another monomer") other than the methyl methacrylate, the (meth)acrylic acid ester (M), and the monomer (B), the monomer copolymerizable with the methyl methacrylate, the (meth)acrylic acid ester (M), and the monomer (B), with respect to 100% by mass of the (meth)acrylic polymer (P).

Examples of the other monomer include (meth)acrylic acid esters such as ethyl (meth)acrylate, isopropyl (meth) acrylate, tert-butyl (meth)acrylate, isobutyl (meth)acrylate, and n-butyl (meth)acrylate; unsaturated carboxylic acids such as (meth)acrylic acid, maleic acid, and itaconic acid; acid anhydrides such as maleic acid anhydride and itaconic acid anhydride; maleimide derivatives such as N-phenylmaleimide and N-cyclohexylmaleimide; vinyl esters such as vinyl acetate and vinyl benzoate; vinyl chloride, vinylidene chloride, and derivatives thereof; nitrogen-containing monomers such as methacrylamide and acrylonitrile; epoxy group-containing monomers such as glycidyl (meth)acrylate; and aromatic vinyl compounds such as styrene and α-methylstyrene, which are not limited thereto.

The resin composition of the present invention can contain, as necessary, a blending agent that can be used in the resin composition. Examples of the blending agent include a solvent, a stabilizer, a lubricant, a processing aid, a plasticizer, an impact-resistant aid, a foaming agent, a filler, an antibacterial agent, an antifungal agent, a mold release agent, an antistatic agent, a coloring agent, a matting agent, an ultraviolet absorbing agent, and a thermoplastic polymer.

<Phosphorus Atom-Containing Compound (C)>

The resin compositions (1) and (2) of the present invention contain the phosphorus atom-containing compound (C). The resin compositions (3) and (4) of the present invention may contain the phosphorus atom-containing compound (C). It is noted that the phosphine compound (D), which will be described later, is excluded from the phosphorus atom-containing compound (C).

The phosphorus atom-containing compound (C) includes at least one selected from a phosphoric acid ester compound and a phosphonic acid ester compound.

When the resin composition contains the phosphorus atom-containing compound (C), the flame retardance of the obtained resin molded product can be improved. When the resin composition of the present invention containing the phosphorus atom-containing compound (C) contains the (meth)acrylic polymer (P) containing the (meth)acrylic acid ester (M) unit, it is possible to obtain a synergistic effect of flame retardance of the obtained resin molded product by using the phosphorus atom-containing compound (C) in combination with the (meth)acrylic acid ester (M) unit.

Examples of the phosphorus atom-containing compound (C) include a halogen-free phosphoric acid ester compound, a halogen-containing phosphoric acid ester compound, a halogen-free phosphonic acid ester compound, and a halogen-containing phosphonic acid ester compound.

Examples of the phosphoric acid ester compound include a compound represented by Formula (II).

(II)

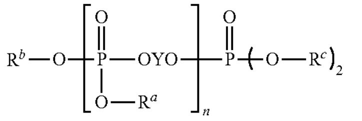

In Formula (II), $R^a$, $R^b$, and $R^c$ each independently represent a hydrogen atom, an alkyl group having 1 to 8 carbon atoms, or a chloroalkyl group having 1 to 8 carbon atoms, Y represents an alkylene group having 1 to 10 carbon atoms, which may contain a heteroatom, and n represents an integer of 0 to 8.

Examples of the phosphonic acid ester compound include a compound represented by Formula (III).

(III)

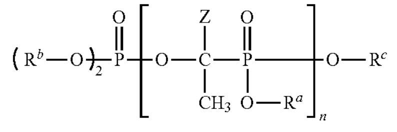

In Formula (III), $R^a$, $R^b$, and $R^c$ each independently represent a hydrogen atom, an alkyl group having 1 to 8 carbon atoms, or a chloroalkyl group having 1 to 8 carbon atoms, and n represents an integer of 0 to 8.

The alkyl group having 1 to 8 carbon atoms in Formula (II) and Formula (III) may be either linear or branched. Examples thereof include a methyl group, an ethyl group, a propyl group, an isopropyl group, an n-butyl group, an isobutyl group, a tert-butyl group, a pentyl group, a hexyl group, a heptyl group, and an octyl group, where a methyl group or an ethyl group is preferable, and a methyl group is more preferable in terms of increasing the phosphorus content in the compound represented by Formula (II) or (III)

The chloroalkyl group having 1 to 8 carbon atoms in Formula (II) and Formula (III) contains at least one chlorine and may be either linear or branched. Examples thereof include a chloromethyl group, a chloroethyl group, a chloropropyl group, a dichloropropyl group, a chlorobutyl group, a chloropentyl group, a chlorohexyl group, a chloropentyl group, and a chlorooctyl group, where a chloromethyl group, a chloroethyl group, or a chloropropyl group is preferable, and a chloropropyl group is more preferable.

$R^a$, $R^b$, and $R^c$ in Formula (II) and Formula (III) are preferably a hydrogen atom or a chloroalkyl group having 1 to 8 carbon atoms, more preferably a chloroalkyl group having 1 to 8 carbon atoms, still more preferably a chloromethyl group, a chloroethyl group, or a chloropropyl group, and particularly preferably a chloropropyl group.

$R^a$, $R^b$, and $R^c$ may be the same or different from each other. Substituents $R^a$, $R^b$, and $R^c$ are preferably the same.

Y in Formula (II) is an alkylene group having 1 to 10 carbon atoms, which may contain a heteroatom.

The alkylene group having 1 to 10 carbon atoms, which does not contain a heteroatom may be linear or branched, and examples thereof include a 1,2-propylene group, a 1,3-propylene group, a 1,2-butylene group, a 1,3-butylene group, a 1,4-butylene group, a 2,3-butylene group, a 1,6-hexylene group, a 2,4-hexylene group, and a 2,5-hexylene group. A 1,2-propylene group or a 1,3-propylene group is preferable from the viewpoint that the phosphorus content in the compound represented by Formula (II) is increased.

The alkylene group having 1 to 10 carbon atoms, which contains a heteroatom may be linear or branched. Examples thereof include an oxyalkylene glycol residue represented by $—CH_2CH_2(OCH_2CH_2)_zOCH_2CH_2—$ (z represents an integer 0 to 3), and specific examples thereof include $—CH_2CH_2OCH_2CH_2—$, $—CH_2CH_2OCH_2CH_2OCH_2CH_2—$, $—CH_2CH_2(OCH_2CH_2)_2OCH_2CH_2—$, and $—CH_2CH_2(OCH_2CH_2)_3OCH_2CH_2—$. From the viewpoint that the phosphorus content in the compound represented by Formula (II) is increased, $—CH_2CH_2OCH_2CH_2—$ or $—CH_2CH_2OCH_2CH_2OCH_2CH_2—$ is preferable, and $—CH_2CH_2OCH_2CH_2—$ is more preferable.

Y in Formula (II) is preferably a 1,2-propylene group, a 1,3-propylene group, or $—CH_2CH_2OCH_2CH_2—$, and more preferably $—CH_2CH_2OCH_2CH_2—$.

Z in Formula (III) is preferably a hydrogen atom, a methyl group, an ethyl group, a chloromethyl group, or a chloroethyl group, more preferably a hydrogen atom or a methyl group, and still more preferably a hydrogen atom.

The compound represented by Formula (II) is preferably a compound in which $R^a$, $R^b$, and $R^c$ are each independently a chloromethyl group or a chloropropyl group, and Y is a 1,2-propylene group, a 1,3-propylene group, $—CH_2CH_2OCH_2CH_2—$, or $—CH_2CH_2OCH_2CH_2OCH_2CH_2—$; more preferably a compound in which $R^a$, $R^b$, and $R^c$ are each independently a chloroethyl group or a chloropropyl group, and Y is $—CH_2CH_2OCH_2CH_2—$; and still more preferably a compound in which $R^a$, $R^b$, and $R^c$ are a chloropropyl group, and Y is $—CH_2CH_2OCH_2CH_2—$.

The compound represented by Formula (III) is preferably a compound in which $R^a$, $R^b$, and $R^c$ are each independently a chloromethyl group, a chloroethyl group, or a chloropropyl group, and Z is a hydrogen atom, a methyl group, an ethyl group, a chloromethyl group, or chloroethyl group; more preferably a compound in which $R^a$, $R^b$, and $R^c$ are each independently a chloroethyl group or a chloropropyl group, and Z is a hydrogen atom, a methyl group, or a chloromethyl group; and still more preferably a compound in which $R^a$, $R^b$, and $R^c$ are a chloropropyl group, and Z is a hydrogen atom.

Examples of the halogen-free phosphoric acid ester compound include halogen-free phosphoric acid esters such as trimethyl phosphate, triethyl phosphate, and triphenyl phosphate; halogen-containing phosphoric acid esters such as tris(chloroethyl) phosphate, tris(chloropropyl) phosphate, tris(dichloropropyl) phosphate, tris(dibromopropyl) phosphate, bis(2,3-dibromopropyl)-2,3-dichloropropyl phosphate, and bis(chloropropyl) octyl phosphate; polyphosphoric acid esters (halogen-containing condensed phosphoric acid esters) containing halogen atoms, such as a halogen-containing alkyl polyphosphate; and derivative compounds thereof, which are not limited to these.

The halogen-free phosphoric acid ester compound can be used alone, or a combination of two or more kinds thereof can be used.

As the halogen-free phosphoric acid ester compound, specifically, the following commercially available products can be used: "JAMP-2", "JAMP-4", "JAMP-8", "JAMP-12", "JP-501", "JP-502", "JP-504", "JP-504A", "JP-506-H", "JP-508", "JP-512", "JP-513", "JP-518-O", "JP-524-R", "LB-58", and "DBP", manufactured by JOHOKU CHEMICAL Co., Ltd.; "TMP", "TEP", "TPP", "TCP", "TXP", "CDP", "PX-110", "#41", "CR-733S", "CR-741", "PX-200", and "DAIGUARD-400/580/610", manufactured by DAIHACHI CHEMICAL INDUSTRY Co., Ltd.; "TMCPP", "CRP", "CR-900", "DAIGUARD-540", and "CR-504L", manufactured by DAIHACHI CHEMICAL INDUSTRY Co., Ltd.; and the like.

As the halogen-containing phosphoric acid ester compound, specifically, the following commercially available products can be used: "TMCPP", "CRP", "CR-900", "DAIGUARD-540", "CR-504L", and the like, manufactured by DAIHACHI CHEMICAL INDUSTRY Co., Ltd.

Examples of the halogen-free phosphonic acid ester compounds include dimethylvinyl phosphonate, diethylvinyl phosphonate, diphenylvinyl phosphonate, diphenylvinylphosphine oxide, and derivative compounds thereof, as well as condensates thereof, which are not limited to these.

The halogen-free phosphonic acid ester compound can be used alone, or a combination of two or more kinds thereof can be used.

As the halogen-free phosphonic acid ester compound, specifically, the following commercially available products can be used: "V-series" manufactured by KATAYAMA CHEMICAL INDUSTRIES, "NONNEN 73" manufactured by Marubishi Oil Chemical Co., Ltd., and the like.

The halogen-containing phosphonic acid ester compound can be used alone, or a combination of two or more kinds thereof can be used, and specifically, a commercially available product such as "CR-570" manufactured by DAIHACHI CHEMICAL INDUSTRY Co., Ltd. can be used.

<Phosphine Compound (D)>

The resin composition of the present invention contains the phosphine compound (D). The phosphine compound (D) is represented by Formula (I).

(I)

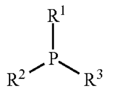

In Formula (I), $R^1$, $R^2$, and $R^3$ each independently represent a hydrogen atom, an alkyl group having 1 to 12 carbon atoms, a cycloalkyl group having 5 to 12 carbon atoms, a (cycloalkyl)alkyl group having 6 to 12 carbon atoms, an aryl group having 6 to 12 carbon atoms, or an aralkyl group having 7 to 12 carbon atoms.

In a case where the resin composition contains the phosphine compound (D), the heat resistance and mechanical strength of the obtained resin molded product are more excellent.

In a case where raw materials (a "monomer mixture" and a "polymerizable composition (S2)", which will be described later) of the resin composition are polymerized in the presence of the phosphine compound (D), it is possible to obtain an effect of remarkably reducing the content of the unreacted monomer in the resin composition. As a result, the obtained resin molded product is excellent in heat resistance and mechanical strength.

For example, it is possible to set the content proportion of the unreacted monomer in the resin composition, specifically, the content proportion of the ethylenically unsaturated monomer, to 4% by mass or less with respect to 100% by mass of the total mass of the resin composition.

A method of controlling the upper limit of the content of the unreacted monomer in the resin composition is not particularly limited. For example, the kind and the adding amount of the phosphine compound (D), the polymerization temperature, and the polymerization time can be controlled by being appropriately adjusted by those skilled in the art according to the technical common knowledge.

For example, when the resin composition contains the (meth)acrylic polymer (P), the content proportion of the unreacted monomer in the obtained resin composition can be set to 4% by mass or less with respect to 100% by mass of the total mass of the resin composition in a case where the ethylenically unsaturated monomer, which is a raw material of the (meth)acrylic polymer (P), is allowed to contain the phosphine compound (D) and polymerized.

Examples of the unreacted monomer include methyl methacrylate and the (meth)acrylic acid ester (M).

Examples of the phosphine compound (D) include trimethylphosphine, tri-n-butylphosphine, tri-tert-butylphosphine, tris-(3-hydroxypropyl)phosphine, tri-n-hexylphosphine, tricyclohexylphosphine, tri-n-octylphosphine, diethylphenylphosphine, methyldiphenylphosphine, ethyldiphenylphosphine, diphenylpropylphosphine, diphenylcyclohexylphosphine, triphenylphosphine, tri-o-tolylphosphine, tri-m-tolylphosphine, tri-p-tolylphosphine, and tris-(4-methoxyphenyl)phosphine, which are not limited thereto. From the viewpoint of ease of handling, triphenylphosphine is preferable.

The phosphine compound (D) can be used alone, or a combination of two or more kinds thereof can be used.

<Method for Producing Resin Composition>

Examples of the method of obtaining the resin composition of the present invention include a method in which a monomer composition (S1) containing methyl methacrylate is allowed to contain the phosphorus atom-containing compound (C) and the phosphine compound (D) to obtain a polymerizable composition (S2), and then the polymerizable composition (S2) is polymerized. That is, the polymerizable composition (S2) contains methyl methacrylate, the phosphorus atom-containing compound (C), and the phosphine compound (D). The polymerizable composition (S2) is the monomer mixture of the present invention.

In a case where the content of the phosphorus atom-containing compound (C) contained in the polymerizable composition (S2) is set to 5 to 35 parts by mass with respect to 100 parts by mass of the monomer composition (S1), it is possible to make the flame retardance of the obtained resin molded product favorable.

In a case where the content of the phosphine compound (D) contained in the polymerizable composition (S2) is set to 20 to 2,000 ppm by mass with respect to 100% by mass of the polymerizable composition (S2), it is possible to make the heat resistance of the obtained resin molded product favorable.

<Monomer Composition (S1)>

The monomer composition (S1) is a composition containing methyl methacrylate.

When the resin composition of the present invention contains the (meth)acrylic polymer (P), the monomer composition (S1) is a composition containing a monomer which is a raw material of the (meth)acrylic polymer (P).

The content proportion of the methyl methacrylate contained in the monomer composition (S1) is not particularly limited. In a case where it is set to 60% to 100% by mass with respect to 100% by mass of the total mass of the monomer composition (S1), it is possible to make favorable the transparency and mechanical strength of the obtained resin molded product.

In a case where the monomer composition (S1) contains the (meth)acrylic acid ester (M), it is possible to make the flame retardance of the obtained resin molded product favorable for the reason described above.

When the monomer composition (S1) contains the (meth) acrylic acid ester (M), the content proportion of the (meth) acrylic acid ester (M) contained in the monomer composition (S1) is not particularly limited. In a case where it is set to 2% to 40% by mass with respect to 100% by mass of the total mass of the monomer composition (S1), it is possible to make favorable the flame retardance and mechanical strength of the obtained resin molded product.

In a case where the content of the methyl methacrylate is set to 60% to 98% by mass and the content of the (meth) acrylic acid ester (M) is set to 2% to 40% by mass with respect to 100% by mass of the total mass of the monomer composition (S1), it is possible to make favorable the flame retardance, transparency, and mechanical strength of the obtained resin molded product.

In a case where the monomer composition (S1) further contains 0.02% to 0.4% by mass of the monomer (B) with respect to 100% by mass of the total mass of the monomer composition (S1), it is possible to make the flame retardance of the obtained resin molded product more favorable.

The monomer composition (S1) can contain in advance a polymer (P1) containing the MMA unit as a main component.

Here, the phrase “containing as a main component” refers to that 85% by mass or more of the MMA unit is contained with respect to 100% by mass of the total mass of the polymer (P1).

The polymer (P1) is a homopolymer of methyl methacrylate or a copolymer containing 85% by mass or more and less than 100% by mass of the MMA unit and containing more than 0% by mass and 15% by mass or less of a repeating unit derived from a monomer copolymerizable with methyl methacrylate with respect to 100% by mass of the total mass of the polymer (P1).

As the monomer copolymerizable with methyl methacrylate, the above-described “copolymerizable monomer” and “(meth)acrylic acid ester (M)” can be used.

Since the polymerizable composition (S2) becomes a viscous liquid (hereinafter, also referred to as a “syrup”) in a case of containing the polymer (P1), the polymerization time can be shortened, and the productivity can be improved.

Examples of the method of obtaining the syrup include the following methods. In addition, as the syrup, a syrup containing the monomer mixture of the present invention can be used.

(Method 1) A method of dissolving the polymer (P1) in a monomer mixture containing methyl methacrylate, the (meth)acrylic acid ester (M), and the monomer (B).

(Method 2) A method of adding a known radical polymerization initiator to methyl methacrylate alone or a monomer mixture containing 85% by mass or more and less than 100% by mass of methyl methacrylate and more than 0% by mass and 15.0% by mass or less of a monomer copolymerizable with methyl methacrylate, polymerizing a part thereof, and then adding a predetermined amount of at least one kind selected from the (meth)acrylic acid ester (M), the monomer (B), methyl methacrylate, and a monomer copolymerizable with methyl methacrylate.

Examples of the radical polymerization initiator to be used for polymerizing a monomer mixture to obtain a syrup of the polymerizable composition (S2) and the radical polymerization initiator to be used for polymerizing the polymerizable composition (S2) to obtain a resin composition include azo compounds such as 2,2'-azobis(isobutyronitrile) and 2,2'-azobis(2,4-dimethylvaleronitrile); and peroxides such as benzoyl peroxide and lauroyl peroxide. In the present invention, as necessary, an accelerator such as an amine or mercaptan can be used in combination with the radical polymerization initiator.

The adding amount of the radical polymerization initiator can be appropriately determined depending on the intended purpose, and 0.01 to 0.5 parts by mass of the radical polymerization initiator can be used with respect to 100 parts by mass of the monomer in the polymerizable composition (S2).

The polymerization temperature during the radical polymerization is appropriately set in a range of 10° C. to 150° C. depending on the kind of radical polymerization initiator to be used. The polymerizable composition (S2) may be polymerized in a multi-step temperature condition, as necessary.

Examples of the radical polymerization method include a bulk polymerization method, a suspension polymerization method, an emulsion polymerization method, and a dispersion polymerization method. In terms of productivity, a bulk polymerization method is preferable, and a casting polymerization (casting polymerization) method is more preferable among the bulk polymerization methods.

When the resin composition is obtained by the casting polymerization method, the resin composition can be obtained, for example, by injecting the polymerizable composition (S2) into a mold and polymerizing the polymerizable composition (S2).

<Resin Molded Product>

The resin molded product of the present invention contains the resin composition of the present invention.

Here, the phrase “containing the resin composition of the present invention” means that the resin composition of the present invention is contained as a main component. Here, when the resin molded product consists of a single material, the phrase “containing as a main component” means that the single material is the resin composition of the present invention, and in a case where the resin molded product consists of a plurality of materials, it means that the material having the highest mass fraction among the constituent materials is the resin composition of the present invention.

The resin molded product of the present invention may be a molded product obtained by molding the resin composition of the present invention.

The heat resistance of the molded product consisting of a resin composition generally tends to decrease as the flame retardance increases, and thus the heat resistance and the flame retardance have a so-called trade-off relationship.

The resin molded product of the present invention can achieve both heat resistance and flame retardance, which are originally in a trade-off relationship.

The shape of the resin molded product is not particularly limited. Examples thereof include a plate-shaped molded product (resin plate). When the resin molded product is a resin plate, the thickness of the resin plate is not particularly limited. The thickness can be set to 6 to 30 mm. In a case where it is equal to or larger than the above-described lower limit value, the resin molded product can have sufficient heat resistance. In a case where it is equal to or smaller than the above-described upper limit value, the moldability of the resin molded product is favorable.

In a case of having a thickness of 6 mm or more, the resin molded product of the present invention can have a flame retardance of V-0 in a vertical combustion test defined by UL94. In a case where the resin molded product has a flame retardance of V-0 in a vertical combustion test defined by UL94, the combustion of the resin molded product does not continue even in a case of being brought into contact with a fire in a case of an outbreak of the fire, which is preferable from the viewpoint of safety, and thus the resin molded product is suitable for use in an illumination light cover for a fluorescent lamp, LED, or the like, in addition to a use, for example, in an illuminated sign in a gas station, and furthermore, for example, a panel for aquariums or a building component.

The thickness of the resin molded product can be measured with a thickness gauge.

<Production Method for Resin Molded Product>

A production method for the resin molded product of the present invention is not particularly limited. For example, it can be produced by using a known casting polymerization method such as a cell casting method or a continuous casting method described later. The casting polymerization method is a method in which a polymerizable raw material for obtaining a resin composition is injected into a mold consisting of two inorganic glass plates or metal plates (SUS plates) disposed to face each other at a predetermined spacing, a periphery of which is sealed with a gasket such as a soft resin tube, and is polymerized to form a resin composition, and the obtained resin composition is peeled from the mold to obtain a resin molded product.

The mold for casting polymerization is not particularly limited, and a known mold can be used. Examples of the mold for obtaining a plate-shaped resin molded product include a mold for cell casting and a mold for continuous casting.

Examples of the mold for cell casting include a mold in which two plate-shaped bodies such as inorganic glass plates, chrome-plated metal plates, or stainless steel plates are disposed to face each other at a predetermined spacing, and a gasket is disposed at an edge part thereof to form a sealed space by the plate-shaped bodies and the gasket.

Examples of the mold for continuous casting include a mold in which a sealed space is formed by facing surfaces of a pair of endless belts traveling in the same direction at the same speed and gaskets traveling at the same speed as the endless belts at both side parts of the endless belts.

As a polymerization method when the casting polymerization method is used, for example, a known method can be used similarly to the above-described method for producing a resin composition.

The cavity spacing of the mold is appropriately adjusted so that a resin plate having a desired thickness is obtained, and it is generally 1 to 30 mm.

EXAMPLES

Hereinafter, the present invention will be described using Examples. Hereinafter, "part" and "%" each represent "part by mass" and "% by mass".

Abbreviations and names of compounds used in Examples and Comparative Examples are as follows.

MMA: Methyl methacrylate (manufactured by Mitsubishi Chemical Corporation)

IBXMA: Isobornyl methacrylate (manufactured by Mitsubishi Chemical Corporation)

IBXA: Isobornyl acrylate (manufactured by Osaka Organic Chemical Industry Ltd.)

EDMA: Ethylene glycol dimethacrylate

Polymerization initiator (1): 2,2'-azobis-(2,4-dimethylvaleronitrile) (manufactured by FUJIFILM Wako Pure Chemical Corporation)

Polymerization initiator (2): PERHEXYL PV (product name, manufactured by NOF CORPORATION)

Phosphorus atom-containing compound (C-1): A halogen-containing condensed phosphonic acid ester (product name: CR-570, manufactured by DAIHACHI CHEMICAL INDUSTRY Co., Ltd.)

Phosphorus atom-containing compound (C-2): A halogen-containing condensed phosphoric acid ester (product name: CR-504L, manufactured by DAIHACHI CHEMICAL INDUSTRY Co., Ltd.)

Phosphine compound (D-1): Triphenylphosphine (manufactured by FUJIFILM Wako Pure Chemical Corporation)

<Evaluation Method>

Evaluations in Examples and Comparative Examples were carried out according to the following method.

(1) Flame Retardance (UL94)

For the test piece (length 127 mm×width 12.7 mm×thickness 10 mm) of the resin molded product obtained in each of Examples and Comparative Examples, the flame retardance was determined as an indicator of flame retardance, using the determination criteria shown in Table 1, in accordance with the vertical combustion test method defined by UL94.

TABLE 1

| | V-0 | V-1 | V-2 | Rejection |
|---|---|---|---|---|
| Combustion time of each test piece after first or second contact with fire | 10 seconds or less | 30 seconds or less | 30 seconds or less | Does not satisfy any conditions of V-0 to 2 |
| Total combustion time of five test pieces (corresponding to two times of contact with fire) | 50 seconds or less | 250 seconds or less | 250 seconds or less | |
| "Combustion time + firing time" of each test piece after second contact with fire | 30 seconds or less | 60 seconds or less | 60 seconds or less | |

TABLE 1-continued

| | V-0 | V-1 | V-2 | Rejection |
|---|---|---|---|---|
| Combustion until clamping | Not occurred | Not occurred | Not occurred | |
| Cotton ignition due to dropwise added substance | Not occurred | Not occurred | Occurred | |

(2) Heat Resistance (HDT)

For the test piece (length 127 mm×width 12.7 mm×thickness 3 mm) of the resin molded product obtained in each of Examples and Comparative Examples, the load deflection temperature (hereinafter, referred to as "HDT") (° C.) was measured as an indicator of the heat resistance, in accordance with JIS K 7191.

(3) Bending Strength

For the test piece (length 200 mm×width 15 mm×thickness 10 mm) of the resin molded product obtained in each of Examples and Comparative Examples, the bending strength (MPa) at a distance between supporting points of 160 mm was measured as an indicator of the mechanical strength, in accordance with JIS K 7171.

(4) Quantification of Unreacted Monomer in Resin Molded Product

The measurement of the unreacted monomers (MMA, IBXMA, and IBXA) in the resin molded product was carried out according to the following procedure, by using a gas chromatography measuring device (GC device) (manufactured by Agilent Technologies, Inc., device name: HP-7890-A type, separation column: DB-WAX manufactured by Agilent Technologies, Inc., inner diameter: 0.25 mm, length: 30 m, film thickness: 0.25 μm, carrier gas: He, detector: FID).

0.5 g of the resin molded product obtained in each of Examples and Comparative Examples was dissolved in 20 mL of acetone and used as a sample for GC measurement. 1.0 μL of the sample for GC was injected into the GC device and subjected to measurement at a separation column temperature of 40° C. From the obtained gas chromatogram, the content proportion (unit: % by mass) of the unreacted monomers in the resin molded product was calculated based on the peak areas of MMA, IBXMA, and IBXA and the calibration curve created in advance.

It is noted that in the creation of the calibration curve, 0.06 g of each of MMA, IBXMA, and IBXA was taken, dissolved in 100 mL of acetone, and diluted with acetone by 2 times, 3 times, and 10 times to prepare three solutions, and n-butyl acetate was added thereto as an internal standard substance to each of the three solutions, and the measurement was carried out in the same manner as described above to create a calibration curve.

(5) Quantification of Phosphine Compound (D) in Resin Molded Product

The measurement of the phosphine compound (D) in the resin molded product was carried out according to the following procedure, by using a gas chromatography measuring device (GC device) (manufactured by Agilent Technologies, Inc., device name: HP-6890 type, separation column: HP-5 manufactured by Agilent Technologies, Inc., inner diameter: 0.25 mm, length: 30 m, film thickness: 0.25 μm, carrier gas: He, detector: FID).

2.0 g of the resin molded product (including the entire portion in the thickness direction) obtained in each of Examples and Comparative Examples was dissolved in 21 mL of acetone and used as a GC measurement sample. 1.0 μL of the sample for GC was injected into the GC device and subjected to measurement at a separation column temperature of 40° C. The content proportion (unit: ppm by mass) of the phosphine compound (D) in the resin molded product was calculated based on the peak area of the phosphine compound (D) in the obtained gas chromatogram and the calibration curve created in advance.

It is noted that in the creation of the calibration curve, triphenylphosphine (product name, manufactured by FUJIFILM Wako Pure Chemical Corporation) as a phosphine compound was dissolved in acetone to a concentration of 15 ppm by mass, triphenylphosphine oxide (product name, manufactured by FUJIFILM Wako Pure Chemical Corporation) as a phosphine oxide-based compound was dissolved in acetone to a concentration of 7.5 ppm by mass, n-butyl acetate was further added thereto as an internal standard substance, followed by appropriate dilution, and the measurement was carried out in the same manner as above to create a calibration curve.

Production Example 1

(Production of Syrup (A))

100.0 parts of MMA was supplied to a reactor (a polymerization tank) equipped with a cooling tube, a thermometer, and a stirrer, bubbling was carried out with nitrogen gas while carrying out stirring, and then heating was started. At a moment when the internal temperature of the reactor reached 60° C., 0.1 parts of a polymerization initiator (1) was added thereto as a radical polymerization initiator, and further, the resultant mixture was heated until the internal temperature of the reactor reached 100° C. and then held for 13 minutes. Next, the internal temperature of the reactor was cooled to room temperature, whereby a syrup (A) was obtained. The content of the polymer in the syrup (A) was 25% by mass, and the content of the monomer composition was 75% by mass with respect to the total mass of the syrup (A).

Production Example 2

(Production of Syrup (B))

77.0 parts of MMA, 21.0 parts of IBXMA, and 2.0 parts of IBXA were supplied to a reactor (a polymerization tank) equipped with a cooling tube, a thermometer, and a stirrer, bubbling was carried out with nitrogen gas while carrying out stirring, and then heating was started. At a moment when the internal temperature of the reactor reached 60° C., 0.1 parts of a polymerization initiator (1) was added thereto as a radical polymerization initiator, and further, the resultant mixture was heated until the internal temperature of the reactor reached 100° C. and then held for 13 minutes. Next, the internal temperature of the reactor was cooled to room temperature, whereby a syrup (B) was obtained. The content of the polymer in the syrup (B) was 23% by mass, and the content of the monomer composition was 77% by mass with respect to the total mass of the syrup (B).

Example 1

(2) Casting Polymerization

A polymerizable composition was obtained by adding 82.8 parts of the syrup (A) obtained in Production Example 1, 5 parts of IBXMA as the (meth)acrylic acid ester (M), 0.15 parts of EDMA as the monomer (B), 12.0 parts of the phosphorus atom-containing compound (C-1) as the phosphorus atom-containing compound (C), 0.045 parts of the phosphorus compound (D-1) as the phosphine compound (D), and 0.01 parts of a polymerization initiator (2) as a radical polymerization initiator. Next, the obtained polymerizable composition was poured into a space having a cavity spacing of 12.3 mm, which was provided by disposing vinyl chloride resin gaskets at the end parts of SUS plates, between the two facing SUS plates, heating was carried out at 70° C. for 90 minutes and then at 130° C. for 60 minutes to cure the polymerizable composition, thereby obtaining a resin composition.

Table 3 shows the formulation of the obtained resin composition.

Next, after cooling the resin composition together with the SUS plates, the SUS plates were removed to obtain a plate-shaped resin molded product having a thickness of 10 mm. The content of the phosphorus atom-containing compound (C) in the resin molded product was 10.7 parts by mass with respect to 100 parts by mass of the (meth)acrylic polymer (P).

Table 2 shows the evaluation results of the obtained resin molded product.

Examples 2 to 6 and Comparative Examples 1 to 4

A resin molded product was obtained in the same manner as in Example 1, except that the formulation of the polymerizable composition was changed as shown in Table 2.

Table 2 shows the formulation of the obtained resin molded product.

In Table 2, "Part by mass (1)" indicates the content (parts by mass) with respect to 100 parts by mass of the (meth) acrylic polymer (P); and "ppm (2)" indicates the content proportion (ppm) with respect to the total mass (100% by mass) of the resin composition (resin molded product).

The resin molded product obtained in each of Comparative Examples 1 to 4 did not contain the phosphine compound (D) and had a large content of the unreacted monomer, and thus the heat resistance and the mechanical strength were insufficient.

INDUSTRIAL APPLICABILITY

According to the present invention, it is possible to stably provide a resin composition and a resin molded product, which have favorable heat resistance and higher flame retardance. Such a resin molded product is excellent in flame retardance, heat resistance, and mechanical strength, and thus it can be suitably used for use applications such as an illumination material, an optical material, a signboard, a display, a decorative member, and a building component.

The invention claimed is:

1. A resin composition comprising:

a (meth)acrylic polymer (P); and a phosphine compound (D), wherein the (meth)acrylic polymer (P) comprises a repeating unit derived from an ethylenically unsaturated monomer,

TABLE 2

| | | | | | Example | | | | | | Comparative Example | | | |
|---|---|---|---|---|---|---|---|---|---|---|---|---|---|---|
| | | | | | 1 | 2 | 3 | 4 | 5 | 6 | 1 | 2 | 3 | 4 |
| Polymerizable composition | Monomer composition (S1) | Syrup (A) | | Part by mass | 82.8 | | 82.8 | | 82.9 | 82.7 | 82.3 | | 82.3 | |
| | | Syrup (B) | | Part by mass | — | 91.8 | | 91.8 | | | | 91.8 | | 91.8 |
| | | (Meth) acrylic acid ester ) (M | IBXMA | Part by mass | 5.0 | | 5.0 | | 5.0 | 5.0 | 5.0 | | 5.0 | |
| | | Monomer (B) | EDMA | Part by mass | 0.15 | 0.15 | 0.15 | 0.15 | 0.15 | 0.15 | 0.15 | 0.15 | 0.15 | 0.15 |
| | Phosphorus atom-containing compound (C) | | (C-1) | Part by mass | 12.0 | 8.0 | | | 12.0 | 12.0 | 12.0 | 8.0 | | |
| | | | (C-2) | Part by mass | | | 12.0 | 8.0 | | | | | 2.0 | 8.0 |
| | Phosphine compound (D) | | (D-1) | Part by mass | 0.045 | 0.045 | 0.045 | 0.045 | 0.005 | 0.15 | | | | |
| Resin composition | (Meth)-acrylic polymer (P) | Methyl methacrylate | MMA | % by mass | 94.14 | 76.87 | 94.14 | 76.87 | 94.15 | 94.14 | 94.11 | 76.87 | 94.11 | 76.87 |
| | | (Meth)-acrylic acid ester (M) | IBXMA | % by mass | 5.69 | 20.97 | 5.69 | 20.97 | 5.68 | 5.69 | 5.72 | 20.97 | 5.72 | 20.97 |
| | | | IBXA | % by mass | | 2.00 | | 2.00 | | | | 2.00 | | 2.00 |
| | | Monomer (B) | EDMA | % by mass | 0.17 | 0.16 | 0.17 | 0.16 | 0.17 | 0.17 | 0.17 | 0.16 | 0.17 | 0.16 |
| | Phosphorus atom-containing compound (C) | | (C-1) | Part by mass (1) | 13.6 | 8.7 | | | 13.6 | 13.7 | 13.7 | 8.7 | | |
| | | | (C-2) | Part by mass (1) | | | 13.6 | 8.7 | | | | | 13.7 | 8.7 |
| | Phosphine compound (D) | | (D-1) | ppm (2) | 180 | 190 | 200 | 220 | 20 | 660 | | | | |
| | Content proportion of unreacted ethylenic unsaturated monomer | | | % by mass | 1.0 | 1.0 | 0.9 | 0.9 | 3.5 | 3.0 | 4.8 | 4.6 | 4.5 | 4.4 |
| Evaluation result of resin molded product | Flame retardance (UL94) | | | | V-0 | V-0 | V-0 | V-0 | V-0 | V-0 | V-0 | V-0 | V-0 | V-0 |
| | Heat resistance (HDT) | | | ° C. | 89 | 95 | 86 | 92 | 63 | 65 | 59 | 62 | 55 | 58 |
| | Bending strength | | | MPa | 100 | 86 | 95 | 81 | 77 | 79 | 76 | 57 | 74 | 60 |

a content proportion of the ethylenically unsaturated monomer which is unreacted, in the resin composition, is 4% by mass or less, the repeating unit derived from the ethylenically unsaturated monomer comprises a repeating unit derived from a (meth)acrylic acid ester (M) having, in a side chain, an aromatic hydrocarbon group or an alicyclic hydrocarbon group having 3 to 20 carbon atoms, and a content proportion of the repeating unit derived from the (meth)acrylic acid ester (M) is 2% to 10% by mass with respect to 100% by mass of a total mass of the (meth)acrylic polymer (P), the (meth)acrylic polymer (P) comprises a repeating unit derived from methyl methacrylate, and a content proportion of the repeating unit derived from methyl methacrylate is 90% to 98% by mass with respect to 100% by mass of a total mass of the (meth)acrylic polymer (P), and the phosphine compound (D) is represented by Formula (I), (I)

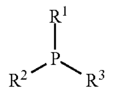

in Formula (I), $R^1$, $R^2$, and $R^3$ each independently represent a hydrogen atom, an alkyl group having 1 to 12 carbon atoms, a cycloalkyl group having 5 to 12 carbon atoms, a (cycloalkyl) alkyl group having 6 to 12 carbon atoms, an aryl group having 6 to 12 carbon atoms, or an aralkyl group having 7 to 12 carbon atoms.

2. A resin composition comprising:

a (meth)acrylic polymer (P); and a phosphine compound (D), wherein the (meth)acrylic polymer (P) comprises a repeating unit derived from an ethylenically unsaturated monomer, the repeating unit derived from the ethylenically unsaturated monomer comprises a repeating unit derived from a (meth)acrylic acid ester (M) having, in a side chain, an aromatic hydrocarbon group or an alicyclic hydrocarbon group having 3 to 20 carbon atoms, and a content proportion of the repeating unit derived from the (meth)acrylic acid ester (M) is 2% to 10% by mass with respect to 100% by mass of a total mass of the (meth)acrylic polymer (P), the (meth)acrylic polymer (P) comprises a repeating unit derived from methyl methacrylate, and a content proportion of the repeating unit derived from methyl methacrylate is 90% to 98% by mass with respect to 100% by mass of a total mass of the (meth)acrylic polymer (P), and the phosphine compound (D) is represented by Formula (I), (I)

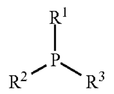

in Formula (I), $R^1$, $R^2$, and $R^3$ each independently represent a hydrogen atom, an alkyl group having 1 to 12 carbon atoms, a cycloalkyl group having 5 to 12 carbon atoms, a (cycloalkyl) alkyl group having 6 to 12 carbon atoms, an aryl group having 6 to 12 carbon atoms, or an aralkyl group having 7 to 12 carbon atoms.

3. The resin composition according to claim 2, wherein the (meth)acrylic polymer (P) comprises a structural unit derived from a monomer (B) having two or more vinyl groups, and a content proportion of the structural unit derived from the monomer (B) having two or more vinyl groups is 0.02% to 0.4% by mass with respect to 100% by mass of a total mass of the (meth)acrylic polymer (P).

4. The resin composition according to claim 2, wherein the resin composition further comprises a phosphorus atom-containing compound (C), and a content of the phosphorus atom-containing compound (C) is 5 to 35 parts by mass with respect to 100 parts by mass of the (meth)acrylic polymer (P).

5. The resin composition according to claim 2, wherein a content of the phosphine compound (D) in the resin composition is 20 to 2,000 ppm by mass with respect to 100% by mass of a total mass of the resin composition.

6. A resin molded product comprising:

the resin composition according to claim 2.

7. The resin molded product according to claim 6, wherein the resin molded product has a flame retardance of V-0 in a vertical combustion test defined by UL94, and a thickness of the resin molded product is 6 mm or more.

8. A panel for aquariums, comprising:

the resin molded product according to claim 6.

9. An illuminated sign comprising:

the resin molded product according to claim 6.

10. A building component comprising:

the resin molded product according to claim 6.

11. A method for producing the resin composition according to claim 2, comprising:

preparation of a polymerizable composition (S2) in which a phosphine compound (D) is added to a monomer composition (S1) comprising methyl methacrylate and a (meth)acrylic acid ester (M) having, in a side chain, an aromatic hydrocarbon group or an alicyclic hydrocarbon group having 3 to 20 carbon atoms; and polymerization of the polymerizable composition (S2), wherein the phosphine compound (D) is represented by Formula (I), (I)

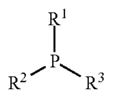

in Formula (I), $R^1$, $R^2$, and $R^3$ each independently represent a hydrogen atom, an alkyl group having 1 to 12 carbon atoms, a cycloalkyl group having 5 to 12 carbon atoms, a (cycloalkyl) alkyl group having 6 to 12 carbon atoms, an aryl group having 6 to 12 carbon atoms, or an aralkyl group having 7 to 12 carbon atoms.

12. A method for manufacturing a resin cast board including the resin molded product according to claim 6, comprising:

injecting a syrup containing a monomer mixture comprising a phosphine compound (D), methyl methacrylate and a (meth)acrylic acid ester (M) having, in a side chain, an aromatic hydrocarbon group or an alicyclic hydrocarbon group having 3 to 20 carbon atoms into a cell and polymerizing the monomer mixture, wherein the phosphine compound (D) is represented by Formula (I),

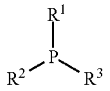

(I)

in Formula (I), $R^1$, $R^2$, and $R^3$ each independently represent a hydrogen atom, an alkyl group having 1 to 12 carbon atoms, a cycloalkyl group having 5 to 12 carbon atoms, a (cycloalkyl) alkyl group having 6 to 12 carbon atoms, an aryl group having 6 to 12 carbon atoms, or an aralkyl group having 7 to 12 carbon atoms.

* * * * *